United States Patent
Skidanov et al.

(10) Patent No.: US 9,141,678 B2
(45) Date of Patent: Sep. 22, 2015

(54) DISTRIBUTED QUERY CACHE IN A DATABASE SYSTEM

(71) Applicants: Alex Skidanov, San Francisco, CA (US); Marko Tintor, San Francisco, CA (US); Nikita Shamgunov, San Francisco, CA (US)

(72) Inventors: Alex Skidanov, San Francisco, CA (US); Marko Tintor, San Francisco, CA (US); Nikita Shamgunov, San Francisco, CA (US)

(73) Assignee: MemSQL, Inc., San Francisco, CA (US)

( * ) Notice: Subject to any disclaimer, the term of this patent is extended or adjusted under 35 U.S.C. 154(b) by 334 days.

(21) Appl. No.: 13/754,371

(22) Filed: Jan. 30, 2013

(65) Prior Publication Data

US 2013/0198231 A1  Aug. 1, 2013

Related U.S. Application Data

(60) Provisional application No. 61/592,440, filed on Jan. 30, 2012, provisional application No. 61/592,446, filed on Jan. 30, 2012, provisional application No. 61/592,453, filed on Jan. 30, 2012.

(51) Int. Cl.
*G06F 7/00* (2006.01)
*G06F 17/30* (2006.01)

(52) U.S. Cl.
CPC .................. *G06F 17/30545* (2013.01)

(58) Field of Classification Search
CPC ............. G06F 17/30395; G06F 17/30967
USPC .................................... 707/770, 779
See application file for complete search history.

(56) References Cited

U.S. PATENT DOCUMENTS

| | | | | |
|---|---|---|---|---|
| 5,875,334 | A * | 2/1999 | Chow et al. | 717/141 |
| 6,178,416 | B1 * | 1/2001 | Thompson et al. | 1/1 |
| 7,631,293 | B2 * | 12/2009 | Alcorn | 717/108 |
| 7,752,197 | B2 * | 7/2010 | Dettinger et al. | 707/721 |
| 7,984,043 | B1 * | 7/2011 | Waas | 707/718 |
| 2003/0187839 | A1 * | 10/2003 | Zhang et al. | 707/4 |
| 2005/0027701 | A1 * | 2/2005 | Zane et al. | 707/3 |
| 2006/0224561 | A1 * | 10/2006 | Bestgen et al. | 707/2 |
| 2006/0271557 | A1 * | 11/2006 | Harward et al. | 707/10 |
| 2009/0089312 | A1 * | 4/2009 | Chi et al. | 707/102 |
| 2009/0234800 | A1 * | 9/2009 | Antani et al. | 707/2 |
| 2013/0198232 | A1 * | 8/2013 | Shamgunov et al. | 707/770 |

* cited by examiner

*Primary Examiner* — Cheyne D Ly
(74) *Attorney, Agent, or Firm* — Robert M. McDermott

(57) ABSTRACT

A distributed query system includes a distributed collection of dynamically created compiled queries. As each client submits a query, a parameterized query skeleton is identified, which identifies the general form of the query, and the parameters associated with the particular query. If a compiled form of the skeletal query is available within the distributed system, it is executed with the parameters of the current query. If the compiled form of the skeletal query is not available within the distributed system, a compiled form is created, and the location of this compiled skeletal query is stored for subsequent access by this client, or other clients. The executable compiled skeletal queries may be stored at each client system, or in a commonly available server storage system.

22 Claims, 3 Drawing Sheets

| QUERY | SKELETAL QUERY FORM |
|---|---|
| Select * from stock where id in(1, 2, 3) | Select * from stock where id in(<@>) |
| | Select * from stock where <C> in(<@>) |
| | Select * from <T> where <C> in(<@>) |
| Select price from stock where id=5 | Select price from stock where id=<@> |
| | Select price from stock where id in(<@>) |
| | Select <C1> from stock where <C2>=<@> |
| | Select <C1> from <T> where <C2>=<@> |
| Select sum(price) from stock where id in(5,6,7) | Select sum(price) from stock where id in(<@>) |
| | Select sum(<C1>) from stock where <C2>in(<@>) |
| | Select <F>(<C1>) from stock where <C2>in(<@>) |
| | Select price from stock where id in(<@>) AS List; SUM (List) |

FIG. 3

| SKELETON QUERY | | LOCATION |
|---|---|---|
| S1 KEY | S1 QUERY FORM | SC17 |
| S2 KEY | S2 QUERY FORM | SC23 |
| S3 KEY | S3 QUERY FORM | SS4 |
| ⋮ | ⋮ | ⋮ |
| Sn KEY | Sn QUERY FORM | SXx |

FIG. 5 ical database management systems allow a user to submit a 'query' for finding and retrieving information that satisfies the query. Although a natural language interpreter may be the goal for developers of database management systems, users are generally required to use a 'query language' to submit such queries. Often, the user's query is a sequence of queries that are sequentially applied, with each query providing an increasingly finer filter for finding the desired information.

DISTRIBUTED QUERY CACHE IN A DATABASE SYSTEM

This application claims the benefit of U.S. Provisional Patent Applications 61/592,440, 61/592,446, and 61/592,453, each filed 30 Jan. 2012.

BACKGROUND AND SUMMARY OF THE INVENTION

This invention relates to the field of database searching, and in particular to a system and method that provides a distributed cache for managing database query plans.

As technologies advance, the amount of information that is being stored in electronic form is ever increasing. Correspondingly, the search for particular information becomes increasingly more time consuming, while, at the same time, the expectation for rapid response increases.

Database management systems (dbms) are designed to organize data in a form that facilitates efficient search and retrieval of select information. Typical database management systems allow a user to submit a 'query' for finding and retrieving information that satisfies the query. Although a natural language interpreter may be the goal for developers of database management systems, users are generally required to use a 'query language' to submit such queries. Often, the user's query is a sequence of queries that are sequentially applied, with each query providing an increasingly finer filter for finding the desired information.

In a typical database management system, a query language interpreter processes each query, creates computer executable code, executes the code, then proceeds to process the next query. Such interpretation, however, may consume a significant amount of time, and the code produced may not be efficient in execution time or memory usage. In a distributed database management system, wherein queries are processed on multiple servers, this potential inefficiency occurs on each of the servers.

Most queries are unique, in that they are typically generated to solve a particular problem, to locate a particular information item, to create a particular grouping of information, and so on. Accordingly, each query is generally processed independently of prior queries.

Some database management systems allow a user to identify queries that may be used frequently, so that the generated computer executable code can be stored for reuse as required. The user may, for example, assign a name or other identifier to a particular query, then refer to that query using this identifier in subsequent queries. When the interpreter recognizes the identifier, it retrieves the code that had been previously created, avoiding the time and resources required to re-generate this code.

In some embodiments of user-definable reusable queries, the user is also provided the option of 'parameterizing' the query so that it can be executed using different arguments as the situation demands. For example, if the user typically queries a database for records having a 'cost' parameter with a value above a particular threshold value, the user may identify the query as "CostThreshold", and identify the threshold value as an argument to this query. Thereafter, the user may submit a query such as "CostThreshold(100)" to find records having a cost value greater than 100. The identification and creation of such parameterized queries, however, typically require a level of expertise that may not be within the skill set of every user, or may not be considered by the user to be worth the time or trouble of creating such parameterized queries.

Even if the time savings provided by reusable code does not have a sufficient payback to warrant an individual user's time and effort to create the reusable code, the cumulative effect of having to regenerate the executable code for each query may be substantial, resulting in poor performance for all users, as the system spends more time regenerating code than in actually executing the code to satisfy each query.

It would be advantageous to reduce the time consumed in the execution of a user's query, or sequence of queries. It would also be advantageous to optimize the use of resources in the execution of such queries.

These advantages, and others, can be realized by a distributed collection of compiled programs. As each client submits a query, a parameterized query skeleton is identified, which identifies the general form of the query, and the parameters associated with the particular query. If a compiled form of the skeletal query is available within the distributed system, it is executed with the parameters of the query. If the compiled form of the skeletal query is not available within the distributed system, a compiled form is created, and the location of this compiled skeletal query is stored for subsequent access by this client, or other clients. The executable compiled skeletal queries may be stored at each client system or in a commonly available server storage system.

BRIEF DESCRIPTION OF THE DRAWINGS

The invention is explained in further detail, and by way of example, with reference to the accompanying drawings wherein:

FIG. 3 illustrates an example set of queries and corresponding parameterized skeletal queries.

FIG. 5 illustrates an example data structure for identifying the location of compiled skeletal queries corresponding to identified skeletal query forms.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The example query processing system is presented using the paradigm of a query processor that overlays and interacts with an underlying conventional database management system. The query processor avails itself of functions and procedures provided by the conventional database management system, and generates executable code that interacts with these functions and procedures. One of skill in the art, however, will recognize that the inventive features presented herein may be included within the core of a database management system that adopts these features as included features.

Also, the example query processing system is presented using the paradigm of a database query system that processes queries that are formed using the operations and format of the standard Structured Query Language (SQL). One of skill in the art will recognize, however, that the principles of this invention may be applied for the processing of queries in other languages as well.

As noted above, in a common database query language, there are perhaps thousands of different forms of queries that may be submitted by a user, and conventional query language interpreters are configured to parse each query into a series of more primitive operations. The inventors have recognized, however, that any particular user of the query language is likely to use a limited subset of query forms, and as such, may often repetitively use the same form of a query, albeit with different parameters for each query, may apply the same query to different databases, and so on. In like manner, different users in the same organization, or different users of the same database, may use the same query forms, albeit with different parameters for each query.

Figure 1:
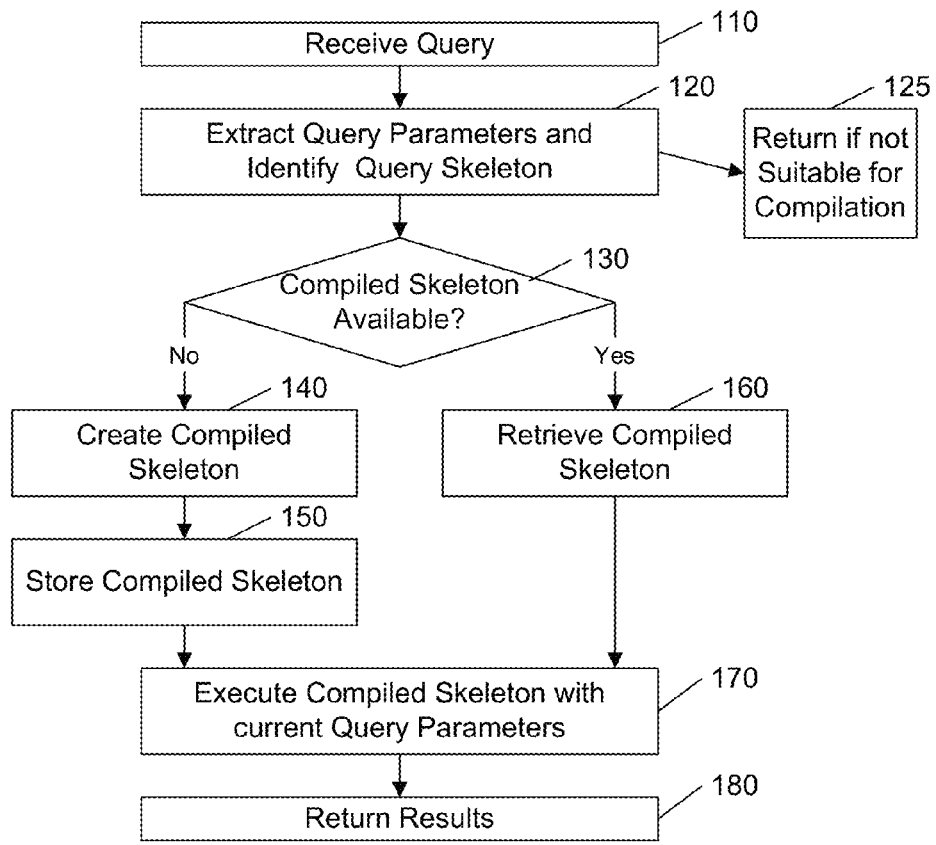
FIG. 1 illustrates an example flow diagram of a query processor in accordance with aspects of this invention.
Figure 2:
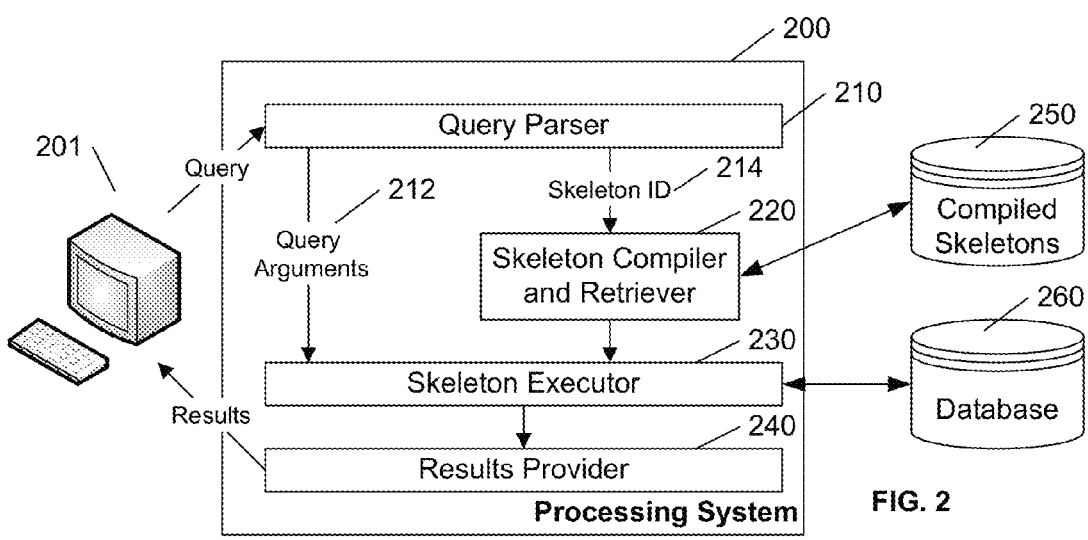
FIG. 2 illustrates an example block diagram of a query processing system that includes a collection of compiled skeletal queries.

Copending U.S. patent application Ser. No. 13/754,333, "REUSING EXISTING QUERY PLANS IN A DATABASE SYSTEM", filed 30 Jan. 2013 for Adam Prout, Marko Tintor, and Alex Skidanov, discloses a method and system for creating compiled parameterized skeletal queries, and is incorporated by reference herein. FIGS. 1-3 are copies of the figures of this copending application. This example embodiment assumes a single user system that compiles skeletal queries from a single user or single client.

FIG. 1 illustrates an example flow diagram of a query processor that identifies a parameterized skeletal query, creates and/or retrieves a compiled version of the skeletal query, then executes the query with the parameters of the current query.

Each query that is submitted by a user, at 110, is parsed to identify the form of the query, hereinafter termed the 'skeletal' form of the query, and the particular parameters associated with this query, at 120. If, at 130, a compiled version of this skeletal query is available, that compiled code is retrieved, at 160, and used to execute the query, at 170, using the parameters/arguments of the current query. If, at 130, a compiled form of the skeletal query does not yet exist, the current query may be compiled, at 140, stored for potential future use, at 150, and executed, at 170, using the parameters/arguments of the current query.

Consider, for example, two basic queries, such as "Select all records in tableA, with name equal to 'smith', 'jones', or 'brown'", and "Select all records in tableA, with name equal to 'adams', 'nagle', 'harris', or 'kelly'". In a conventional query processor, each of these queries would likely invoke the same set of computer instructions, with the exception that in the first query, a search will be conducted for each of the three match values of 'smith', 'jones', or 'brown', and in the second query, a search will be conducted for each of the four match values of 'adams', 'nagle', 'harris', or 'kelly'.

In an embodiment of this invention, a skeletal form of this basic query may be of the form "Select all record in tableA, with name equal to one of <list>". When a compiled version of this skeletal query is created, it may be created in a parameterized form, wherein the particular list of match values is encoded as an argument to the compiled query. The particular list of match values is provided to the compiled query when the compiled query is invoked ('called'). In like manner, a skeletal form of this basic query may also include the identifier of the column as an argument, such as "Select all record in tableA, with <column> equal to one of <list>".

Techniques for the compilation of queries are well known in the art, such as the technique disclosed in "Efficiently Compiling Efficient Query Plans for Modern Hardware", Thomas Neumann, Proceedings of the VLDB Endowment, Vol. 4, No. 9, pp. 539-550 (September 2011).

Although creating a compiled version of a single skeletal query may be more time and resource consuming than the conventional interpretation and decomposition of a query into a series of primitive operations, the potential savings in execution time using a compiled version of a query, and particularly, the potential savings in interpretation and execution time and resources when a compiled version is re-used, will generally provide for a substantial improvement in the overall execution of the user's queries.

It should be recognized that providing compiled versions of a query does not exclude the conventional use of un-compiled queries. If a particular query is deemed unsuitable for compilation, due to the complexity or uniqueness of the query, or a recognition that the conventional processing of this un-compiled query is sufficiently efficient, or other factors, the creation of a compiled version of the query may be bypassed, at 125.

FIG. 2 illustrates an example block diagram of a query processing system 200 that includes a collection of compiled skeletal queries 250. The query parser 210 is configured to receive and parse a query from a user terminal 201. In particular, the query parser 210 identifies parameters contained in the query based on the syntax of the particular query statement and other considerations. Upon identifying each parameter that will be extracted from the query to form a skeletal query, the resultant skeletal query is defined.

Any or all of the parameters of the query may be selected to be arguments in a skeletal query corresponding to the particular query. The choice of which parameters to select as dynamic arguments will often be dependent on the expected difficulty in creating a procedure that allows the parameter to be passed to the procedure, as compared to the generally less difficult task of including the parameter directly within the procedure. Including more parameters as arguments to the skeletal query allows that skeletal query to be potentially applicable to more queries than a skeletal query with built-in parameters, because the particular query in the latter case would have to have exactly the same value of these built-in parameters.

FIG. 3 illustrates an example set of user queries and corresponding sets of example parameterized skeletal queries.

The first query 310 is an SQL query that returns all of the records (rows) in the table "stock" that have a value of 1, 2, or 3 in the column "id". This query includes the SQL operational terms of: Select, From, and Where; and has parameters "*" (entire record), "stock", "id", and the match values of 1, 2, and 3.

A variety of skeletal queries 315a-315c, and others, may be defined from the user query 310, depending upon the particular features of the embodiment of the query parser 210 (of FIG. 2). Embodiments of the query parser 210 may parameterize each of the parameters "stock" (the particular table), "id" (the particular column within the table), and "1, 2, 3" (the particular value to be matched to the value in the identified column of the table).

A basic embodiment of the query processor may be configured to parameterize the values that are to be matched, as illustrated by the example query form 315a. The SQL operational terms "Select", "From", and "Where", and the parameters "*", "stock", and "id" are included as integral parts of the query form 315a, whereas the value parameters "1, 2, and 3" are represented by an argument "<@>". Given a compiled version of query form 315a, that compiled query can be used for any search of the stock table for records having particular id values, by passing the particular match values as arguments of the compiled query. To accommodate different sets of match values, including a different number of values included for matching, the value parameters may be passed to the compiled query as elements of a variable length list.

In a more complex embodiment, the query processor may be configured to also include the column to be searched as an argument in the query form, as illustrated by the "<C>" argument in the query form 315b. In a further embodiment of the query processor, the table to be searched may also be passed as an argument in the query form, as illustrated by the "<T>" argument in the query form 315c.

Query 320 includes an additional parameter "price" in the query. As contrast to the parameter in query 310, which returns the entire record for all records that have the specified id value, query 320 will return only the value of the price entry in the record for all records that have the specified id value. Query 320 also includes a single value "5" that is to be matched with the value of id in the stock table.

In a basic embodiment of the query processor, this price parameter is included as an integral element in the skeletal query form, as illustrated in query form 325a. The particular value ("5") of the id parameter that is to be matched is included as an argument ("<@>") to the query form 325a, allowing this compiled query to find the price of any particular id value. FIG. 3 also illustrates alternative skeletal query forms 325b-325d that may be formed to satisfy query 320 in more complex embodiments of the query processor.

In like manner, FIG. 3 illustrates alternative query forms 335a-d that may be formed to satisfy query 330. Of particular note, query 330 includes a function "sum(price)". In the example skeletal forms 330a-c, this function is considered a parameter of the skeletal query form. Alternatively, recognizing that function operations are often performed after the records are selected, the query processor may be configured to partition a query that includes a function call to provide a result into a sequence of operations, such as an operation (query) that identifies the values that are to be provided to the function, followed by the operation of this function on these values, as illustrated by the example query form 335d. In this example, all of the prices in the table stock having an id matching an entry in the argument list "<@>" are returned in a list named "List", using the "Select . . . AS <name>" option. This returned list is then passed to a "SUM" function that provides a sum of the returned prices in List.

One of skill in the art will recognize that any particular embodiment of the query parser 210 of FIG. 2 will parse each user's query so as to produce a particular skeletal query with a potential combination of non-argumented parameters and argumented parameters (parameters that are passed as arguments to the skeletal query). For a user's query to be characterized as corresponding to a previously defined skeletal query, the form of the query must match the skeletal query with the defined operations and non-argumented parameters (hereinafter the skeletal query form), and provide parameters that can be passed to the skeletal query as arguments that are consistent with this particular skeletal query form. For example, a query parser 210 that identifies and generates the skeletal query of 315a will characterize a subsequent user query of the form "Select * from stock where id in ( . . . )" as a query that corresponds to the skeletal query 315a with defined operations "Select", "from", "where" and "in", and non-argumented parameters "*", "stock", and "id". The values within the parentheses following the "in" operation are the parameters that are passed as arguments ("<@>") to the compiled skeleton query corresponding to skeletal query 315a.

Returning to FIG. 2, the query parser 210 will provide an identifier 214 of the determined skeleton query, as well as the parameter values for each of the identified argumented parameters as query arguments 212 to the identified skeleton query. The identifier 214 of the determined skeleton query may be of the form identified in the skeleton query column of FIG. 3, wherein each database term (e.g. "select", "from", "where", "in") used in the query is identified, as well as the parameters that are not argumented, and an identification of the parameters that are expected to be passed as an argument to this skeletal query. Of particular note, all user queries of the same form (as defined by the query parser 210) will produce the same identifier 214, albeit with potentially different values of the query arguments 212.

The skeleton compiler and receiver 220 determines whether this identifier 214 matches any of prior identifiers received from the parser 210. If it does, the skeleton compiler and retriever 220 merely retrieves the compiled version of the skeletal query that was produced when the prior identifier was received and processed. If the identifier 214 of the skeletal query does not match one of the previously received and processed identifiers, the skeleton compiler and retriever 220 initiates a process that creates a procedure corresponding to the skeletal query and provides a compiled version of this procedure.

Depending upon the expected number of different skeletal queries, the skeleton compiler and retriever 220 may be configured to execute a search for a matching skeleton query form using any of a variety of well known techniques. In a simple embodiment, for example, each identified skeletal query may be stored with the communicated identifier 214, and each subsequent skeletal query will be compared, one by one, with each of the prior identifiers 214. In another fairly simple embodiment, the initial database command (e.g. "select") may be used to partition the skeleton queries into searchable subsets, within which the aforementioned search for matching identifiers 214 may be conducted. Similarly, secondary commands (e.g. "from databaseA") may be used to further partition the skeleton queries into searchable subsubsets within which the search for matching identifiers 214 may be conducted.

In some embodiments, a hash value of one or more of the terms in the skeletal query form may be used to generate a unique value corresponding to each skeletal query form, or each skeletal query form within a subset. Each new skeletal query form is identified by a "null" value at a memory location identified by the hash value. As each new skeletal query is created, the value at the memory location identified by the hash value may indicate a location at which the compiled version of the skeleton query may be found. Conventional hash table techniques may be used to deal with potential duplicates of hash values.

For example, the value at the memory location corresponding to the hash value may point to the start of a linked list.

Each entry of the linked list may include the full skeletal query form, the location where a compiled version of the skeletal query may be found, and a pointer (link) to the next table entry, if any, of another full skeletal query form that hashes to this same hash value. If the value at the memory location corresponding to the current hash value is not 'null', the current skeletal query form is compared to each of the full skeletal query forms in the linked list until a match is found. If a match is not found, the current skeletal query is compiled, and a new entry is added to the linked list associated with the hash value of the current skeletal query.

A skeleton executor 230 is configured to execute the compiled skeleton query to an identified database 260, using the current query arguments 212. A result provider 240 is configured to return the result of the query. In some embodiments, any post-processing functions or tasks may be included within the result provider 240. For example, if the count(*) function of query 310 was not included as an argument to the skeleton query, and otherwise not included in the compiled query that was executed at 230, the results provider 240 may be configured to count the number of records returned by the skeletal query code executed at 230. Alternatively, the results provider may merely return the selected records/rows based on the skeletal query, and rely on the underlying database management system to execute the count (*) function, where * is the returned records from the skeletal query.

Embodiments of this invention include a distributed collection of compiled queries that may be accessed by multiple clients.

Figure 4:
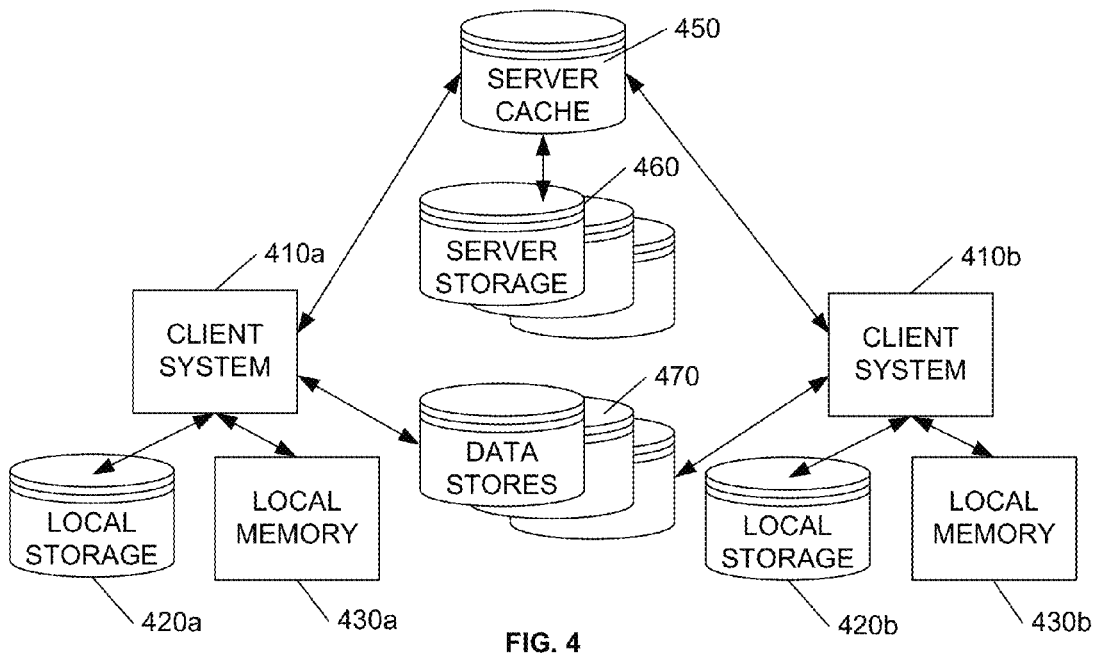
FIG. 4 illustrates an example block diagram of a distributed query system with skeletal cache.

FIG. 4 illustrates a block diagram of a first example embodiment of a distributed query system. In this example, two client systems 410*a*, 410*b* communicate with a server cache 450 to obtain compiled skeletal queries that facilitate access to data stores 470. One of skill in the art will recognize that the number of client systems and server caches may differ from this example embodiment.

As in the above example of a single client system, each client 410*a*, 410*b* includes local storage 420*a*, 420*b* for persistent storage of previously compiled queries, and local memory 430*a*, 430*b* into which these compiled queries may be loaded for execution by the client system 410*a*, 410*b*. When the client system 410*a*, 410*b*, executes the compiled query, using parameters that are specific to the particular query, the data stores 470 are accessed and the requested information is provided to the requesting client system 410*a*, 410*b*.

As contrast to the single client system of FIG. 2, the server cache 450 may be configured to store other compiled skeletal queries at server storage 460. For example, as each client 410*a*, 410*b* creates a new compiled skeletal query, it may forward a copy to the server cache 450. Thereafter, each client 410*a*, 410*b* is able to retrieve and use a compiled skeletal query that was created by a different client.

Optionally, because the server storage 460 may include all of the compiled skeletal queries, regardless of origin, the use of local storage 420*a*, 420*b* at the client systems 410*a*, 410*b* may be optional. That is, some or all of the client systems may rely on retrieving all compiled skeletons from the server storage 460, via server cache 450.

Also, one of skill in the art will recognize that the use of a server cache 450 is also optional, in that the client systems 410*a*, 410*b* may be configured to access the server storage 460 directly. Preferably, the server cache 450 provides faster access to the compiled skeletons by keeping recently accessed, or frequently accessed, skeletons available at the cache 450, thereby avoiding the need to access the server storage 460, which is likely to have slower retrieval times.

Also optionally, the server cache 450 may merely include a list of locations for obtaining the compiled skeletons, and may provide the location in response to the request to obtain the corresponding compiled skeleton query corresponding to the identified skeleton query form. This location may be a location within the server storage 460, or within the local storage 420 of one of the clients 410. This embodiment may not provide the speed of access of a server cache that contains the actual compiled code, but reduces the amount of storage required to contain the compiled skeleton query code.

Although the invention is described hereinafter using the paradigm of a server cache that includes cache memory and server storage, one of skill in the art will recognize that as the term server cache is used herein, the server cache may include any embodiment that is able to facilitate providing compiled query code to a plurality of clients in a distributed database query system, either by providing the compiled code directly, or by providing a location form which the compiled code may be obtained.

FIG. 5 illustrates an example skeleton location table that may be used to facilitate access to stored skeletal queries at the server system 450-460 upon receipt of a request from a client 410. In this example, each compiled skeleton includes a description of the skeletal query 510, and a location 520 at which the compiled skeleton may be found.

When a client 410 submits a compiled skeleton to the server cache 450, it will include a description of the skeleton (the aforementioned skeletal query form of non-argumented parameters) and a description/list of the argumented parameters, which the server cache 450 may include as the skeletal query form 514 directly, or after some pre-processing for compatibility among clients. When a (different) client subsequently submits a request for a compiled skeleton having this skeletal query form, the server cache 450 initiates a search for a matching skeletal query form 514.

To facilitate the search for a matching skeletal query form, the server cache 450 may use one or more skeleton "keys" 512 that serve to reduce the range of the search or otherwise increase the speed of the search. For example, the skeletal queries may be ordered based on the order of query commands in the skeleton. Queries starting with "Select" may be grouped together, and within that grouping, are ordered based on the next command or parameter (e.g. "<F>", "*", etc.), with further sub-groups based on the subsequent commands or parameters. Given an ordered list of skeletal query keys 512, conventional search techniques may be applied to quickly determine whether a matching skeleton key 512 and corresponding matching skeleton query form 514 is located at the server system 450-460. If a match is found, the location field 520 identifies where the compiled version of the requested skeletal query form may be found.

Other ordering and search techniques will be apparent to one of skill in the art. For example, the skeletal query key 512 may be a hash value that is created from a hash of the skeletal query form 514, and conventional hash table techniques may be used to determine the location of the complied version of the skeletal query, as detailed above.

The location field 520 may identify a location in the skeletal cache 450, if the requested skeletal form has been recently accessed, or is frequently accessed, or a location in the skeletal storage 460. In an alternative embodiment, a location at the client storage 420 of the client that created the compiled skeleton may be cited for locating the compiled skeleton, reducing or eliminating the need for skeletal storage 460. That is, instead of submitting the compiled version to the server cache 450, the client system 410 that creates the compiled version may merely submit the skeletal query form 514, and an identification of where the compiled version may be obtained from this client system 410. One of skill in the art will recognize that any of a variety of architectures may be used for dynamically storing and retrieving copies of compiled version of skeletal queries based on an identification of a corresponding skeletal query form, as detailed herein.

Figure 6:
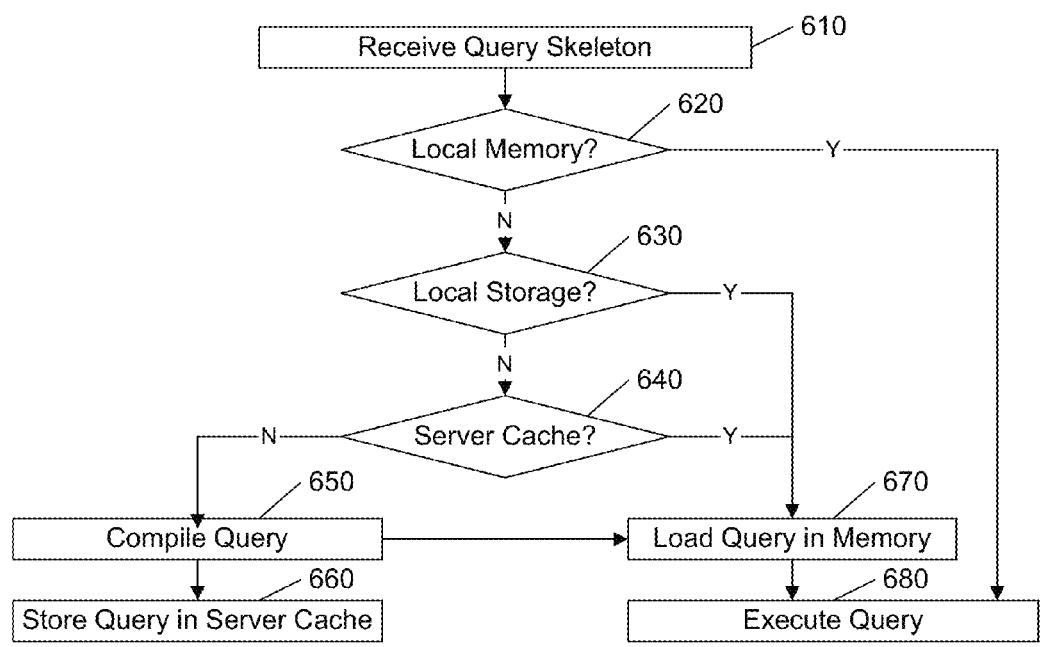
FIG. 6 illustrates an example flow diagram for locating and executing compiled skeletal queries corresponding to an identified skeletal query form.

FIG. 6 illustrates an example flow diagram for obtaining a compiled version of a skeletal query in a system wherein these compiled copies may be stored at the client's local memory or storage, or at a memory or storage that is accessible via a server.

At 610, upon receipt of a query, the query processing system identifies a skeletal query form corresponding to this query; the skeletal query form identifies the form of the query in terms of the non-argumented parameters/commands (parameters or commands embedded within the compiled query) and the argumented parameters (parameters passed as arguments to the compiled query), as detailed above.

If the compiled version of the skeletal query is already loaded with the executable code in the client's memory, at 620, it is executed with the parameters for this particular query, at 680. Otherwise, the client's local storage, if any, is searched for the compiled version of the skeletal query. If, at 630, the compiled version is found in the client's local storage, it is loaded with the executable code in the client's memory, at 670, then executed with the parameters for this particular query, at 680.

If the compiled version of the skeletal query is not available at the client, the client requests a copy of the compiled version from a server. If, at 640, the server is able to provide a compiled version of the skeletal query, it is loaded with the executable code in the client's memory, at 670, then executed with the parameters for this particular query, at 680.

If, at 640, a compiled version of the skeletal query is not available at the client or the server, the client creates a compiled version of the skeletal query using techniques common in the art, at 650. This compiled version is loaded with the executable code in the client's memory, at 670, then executed with the parameters for this particular query, at 680. Additionally, a copy of the compiled skeletal query is submitted to the server, at 660. This submission to the server may be scheduled as a 'background' task, so as not to interfere with the database querying operations. As noted above, the client may merely send the skeletal query form and a location at which to find the compiled version at the client storage, in lieu of sending the compiled version to the server.

Optionally, to reduce the required feature set at the client systems, the server may be configured to create the compiled versions of skeletal queries that are not yet available from the server. That is, step 650 of FIG. 6 may be performed by the server, rather than by the client that initiated the query. These and other variations on the processes used, or the sequence of processes will be evident to one of skill in the art in view of this disclosure.

The foregoing merely illustrates the principles of the invention. It will thus be appreciated that those skilled in the art will be able to devise various arrangements which, although not explicitly described or shown herein, embody the principles of the invention and are thus within its spirit and scope. For example, although a discrete server cache 450 is referenced in the above disclosure, one of skill in the art will recognize that a distributed server cache may also be provided. For example, using the example of a server cache that provides the location of compiled code, rather than the actual code, the list of locations such as illustrated in FIG. 5 may be maintained at each client 410. In an example embodiment, each client 410 includes a list of skeleton query forms and corresponding locations, and as each client 410 creates a new skeleton query form and corresponding compiled code, the client broadcasts the new skeleton query form and the location of the corresponding compiled code to all of the other clients, thereby creating a server cache that is present at each of the clients. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of a combination of hardware portions (e.g., including discrete and integrated electronic circuitry) and software portions (e.g., computer programming).
f) hardware portions may include a processor, and software portions may be stored on a non-transitory computer-readable medium, and may be configured to cause the processor to perform some or all of the functions of one or more of the disclosed elements;
g) hardware portions may be comprised of one or both of analog and digital portions;
h) any of the disclosed devices or portions thereof may be combined together or separated into further portions unless specifically stated otherwise;
i) no specific sequence of acts is intended to be required unless specifically indicated; and
j) the term "plurality of" an element includes two or more of the claimed element, and does not imply any particular range of number of elements; that is, a plurality of elements can be as few as two elements, and can include an immeasurable number of elements.

We claim:
1. A method comprising:
parsing a user query at a client to identify a skeletal query form corresponding to the user query and one or more arguments associated with the user query, receiving a request from the client of a plurality of clients for a compiled skeletal query corresponding to the identified skeletal query form, the compiled skeletal query including machine code that is executable directly by a processing system for accessing records of a database;
searching a server cache to determine whether the compiled skeletal query corresponding to the identified skeletal query form from another client of the plurality of clients is available;
upon determining that the compiled skeletal query is available:
providing access to the compiled skeletal query to the client, in response to the request;
executing the compiled skeletal query at the client using the arguments associated with the user query; and
providing results of the executing of the compiled skeletal query in response to the user query; and
upon determining that the compiled skeletal query is not available:
creating a new compiled skeletal query corresponding to the identified skeletal query form, the new compiled skeletal query comprising executable machine code for accessing records of the database;

executing the new compiled skeletal query at the client using the one or more arguments associated with the user query; and providing results of the executing of the new compiled skeletal query in response to the user query.

2. The method of claim 1, wherein the user query includes a search of the database for records having a parameter value equal to one or more user identified values, and the one or more arguments of the user query include the one or more user identified values.

3. The method of claim 1, wherein the user query conforms to a Structured Query Language (SQL) query.

4. The method of claim 1, including making the new compiled skeletal query available to the server cache.

5. The method of claim 1, wherein the server cache is in communication with a plurality of clients, and each compiled skeletal query is made available to each of the plurality of clients.

6. The method of claim 1, wherein the server cache includes server storage for storing some or all of the compiled skeletal queries.

7. The method of claim 1, wherein the server cache provides access to the compiled skeletal query by communicating a location of the compiled skeletal query to the client.

8. A non-transitory computer-readable medium that includes a computer program, which, when executed by a processing system at a client causes the processing system to:

receive a user query at a client for selecting data from a database;

parse the user query to identify a skeletal query form corresponding to the user query and one or more arguments associated with the user query;

access a server cache that is in communication with other clients to determine whether a compiled skeletal query from an other client corresponding to the identified skeletal query form is available, the compiled skeletal including machine code that is executable directly by the processing system for accessing records of the database; and upon determining that the compiled skeletal query is available:

execute the compiled skeletal query using the one or more arguments of the user query, and provide results of the executing of the compiled skeletal query in response to the user query; and upon determining that the compiled skeletal query is not available:

create a new compiled skeletal query corresponding to the identified skeletal query form;

execute the new compiled skeletal query using the one or more arguments associated with the user query; and provide results of the executing of the compiled skeletal query in response to the user query.

9. The medium of claim 8, the computer programs causes the processing system at the client to provide the server cache with access to the new skeletal query form and compiled skeletal query.

10. The medium of claim 8, wherein the user query includes a search of the database for records having a parameter value equal to one or more user identified values, and the one or more arguments of the user query include the one or more user identified values.

11. The medium of claim 8, wherein the user query conforms to a Structured Query Language (SQL) query.

12. A non-transitory computer-readable medium that includes a computer program, which, when executed by a processing system at a server causes the processing system to:

receive a request from a client of a plurality of clients for a compiled skeletal query corresponding to an identified skeletal query form, the compiled skeletal query including machine code that is executable directly by the processing system for accessing records of a database;

determine whether the compiled skeletal query from another client corresponding to the identified skeletal query form is available; and, upon determining that the compiled skeletal query is available, providing access to the compiled skeletal query to the client, in response to the request; and, upon determining that the compiled skeletal query is not available, the client:

creates a new compiled skeletal query corresponding to the identified skeletal query form, the compiled skeletal query comprising executable machine code for accessing records of the database, and provides access to the new compiled skeletal query to the processing system at the server, to facilitate access to the new compiled skeletal query by the plurality of clients.

13. The medium of claim 12, wherein the skeletal query form corresponds to a parsing of a user query to identify the skeletal query form and one or more arguments associated with the user query, and determining whether the compiled skeletal query is available includes finding the compiled skeletal query that matches the skeletal query form and accepts the one or more arguments as input arguments to the compiled skeletal query.

14. The medium of claim 12, wherein the compiled skeletal query is configured to perform a search of a database for records having a parameter value equal to one or more identified values that are passed as arguments to the compiled skeletal query.

15. The medium of claim 12, wherein the processing system at the server has access to a storage for storing the compiled skeletal query, and provides access to the compiled skeletal query by communicating the compiled skeletal query to the client.

16. The medium of claim 12, wherein the computer program causes the processing system to provide access to the compiled skeletal query by communicating a location of the compiled skeletal query to the client.

17. A system comprising:
a plurality of clients; and
a server cache;
wherein:
a client of the plurality of clients parses a user query to identify a skeletal query form corresponding to the user query and one or more arguments associated with the user query for accessing records of a database, and communicates a request to the server cache to access to a compiled skeletal query from an other client corresponding to the identified skeletal query form, the compiled skeletal query including machine code that is executable directly by the processing system for accessing records of the database;

upon determining, at the server cache, that the compiled skeletal query is available:

the server cache provides access to the compiled skeletal query to the client; and the client executes the compiled skeletal query using the one or more arguments of the user query, and provides results of the execution of the compiled skeletal query in response to the user query; and upon determining, at the server cache, that the compiled skeletal query is not available, the client:

compiles a new compiled skeletal query corresponding to the skeletal query form, the new compiled skeletal query comprising executable machine code for accessing records of the database, executes the new compiled skeletal query using the one or more arguments of the user query, and provides results of the execution of the new compiled skeletal query in response to the user query.

18. The system of claim 17, wherein the server cache includes a storage that includes a plurality of compiled skeletal queries, and the server cache provides access to the compiled skeletal query by communicating the compiled skeletal query to the client.

19. The system of claim 17, wherein the server cache provides access to the compiled skeletal query by communicating a location of the compiled skeletal query to the client.

20. The system of claim 17, wherein the client provides the server cache access to the new compiled skeletal query.

21. The system of claim 17, wherein the user query includes a search of the database for records having a parameter value equal to one or more user identified values, and the one or more arguments of the user query include the one or more user identified values.

22. The system of claim 17, wherein the user query conforms to a Structured Query Language (SQL) query.

* * * * *